US012686771B2

(12) United States Patent
Imaizumi et al.

(10) Patent No.: US 12,686,771 B2
(45) Date of Patent: Jul. 21, 2026

(54) ANTI-FOULING SILICONE COMPOSITE SHEET AND METHOD FOR PERFORMING PREVENTION OF GRAFFITI USING SAME

(71) Applicant: SHIN-ETSU CHEMICAL CO., LTD., Tokyo (JP)

(72) Inventors: Keiji Imaizumi, Takasaki (JP); Akihiro Endo, Annaka (JP); Masaki Moteki, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 409 days.

(21) Appl. No.: 18/254,987

(22) PCT Filed: Nov. 22, 2021

(86) PCT No.: PCT/JP2021/042730
§ 371 (c)(1),
(2) Date: May 30, 2023

(87) PCT Pub. No.: WO2022/124060
PCT Pub. Date: Jun. 16, 2022

(65) Prior Publication Data
US 2024/0002663 A1　Jan. 4, 2024

(30) Foreign Application Priority Data
Dec. 10, 2020　(JP) ................................. 2020-205325

(51) Int. Cl.
*C08L 83/04*　(2006.01)
*B32B 7/12*　(2006.01)
(Continued)

(52) U.S. Cl.
CPC ................ *C08L 83/04* (2013.01); *B32B 7/12* (2013.01); *B32B 27/08* (2013.01); *B32B 27/16* (2013.01);
(Continued)

(58) Field of Classification Search
CPC .......... C08L 27/12; C08L 27/14; C08L 27/16; C08L 27/18; C08L 27/20; C08L 83/40;
(Continued)

(56) References Cited

U.S. PATENT DOCUMENTS

2003/0082973　A1　5/2003　Yamamoto et al.
2011/0217541　A1*　9/2011　Shimano ................. C09D 7/62
428/323
(Continued)

FOREIGN PATENT DOCUMENTS

JP　　H06-182290　A　7/1994
JP　　H09-094524　A　4/1997
(Continued)

OTHER PUBLICATIONS

JP 2008-183802 Machine Translation (Year: 2008).*
(Continued)

*Primary Examiner* — Zachary M Davis
(74) *Attorney, Agent, or Firm* — OLIFF PLC

(57) ABSTRACT

An anti-fouling silicone composite sheet including: a substrate layer containing a fluororesin; and a silicone adhesive layer stacked on one surface of the substrate layer, having a hardness of 5 or less as measured with an Asker C hardness tester, and having an adhesive force with respect to a mortar test piece of 5 N/25 mm or more, wherein the substrate layer has a surface on which the silicone adhesive layer is stacked and the other surface is an anti-fouling surface. By the above configuration, the present invention provides an anti-fouling silicone composite sheet capable of exhibiting anti-fouling performance, washability, easiness of washing, and wear resistance stably for a long period, easily attachable to an adherend, and conformable even to cracking and shifting on (Continued)

the application surface; and a method for performing a prevention of graffiti by using the anti-fouling silicone composite sheet.

12 Claims, 1 Drawing Sheet

(51) Int. Cl.

| | |
|---|---|
| *B32B 27/08* | (2006.01) |
| *B32B 27/16* | (2006.01) |
| *B32B 27/32* | (2006.01) |
| *B32B 27/36* | (2006.01) |
| *C09J 7/29* | (2018.01) |
| *C09J 7/38* | (2018.01) |
| *C09J 183/04* | (2006.01) |

(52) U.S. Cl.
CPC ............ *B32B 27/322* (2013.01); *B32B 27/36* (2013.01); *C09J 7/29* (2018.01); *C09J 7/38* (2018.01); *C09J 183/04* (2013.01); *B32B 2250/24* (2013.01); *B32B 2255/10* (2013.01); *B32B 2255/26* (2013.01); *B32B 2307/536* (2013.01); *B32B 2307/554* (2013.01); *B32B 2307/7376* (2023.05); *B32B 2307/748* (2013.01); *B32B 2405/00* (2013.01)

(58) Field of Classification Search
CPC ......... C08L 83/06; C08L 83/08; C09J 183/04; C09J 183/06; C09J 183/08; B32B 27/322
See application file for complete search history.

(56) References Cited

U.S. PATENT DOCUMENTS

| | | | |
|---|---|---|---|
| 2015/0079345 A1 | 3/2015 | Kurata et al. | |
| 2016/0122593 A1 | 5/2016 | Kurata et al. | |
| 2017/0306188 A1* | 10/2017 | Fujimoto | ............... B32B 27/36 |
| 2017/0342677 A1 | 11/2017 | Uno et al. | |
| 2018/0251661 A1* | 9/2018 | Uno | ...................... E01D 19/103 |
| 2023/0144516 A1 | 5/2023 | Endo et al. | |

FOREIGN PATENT DOCUMENTS

| | | | | |
|---|---|---|---|---|
| JP | H10-216619 | A | | 8/1998 |
| JP | 2002-249739 | A | | 9/2002 |
| JP | 2003-138231 | A | | 5/2003 |
| JP | 2005-097527 | A | | 4/2005 |
| JP | 2005-262134 | A | | 9/2005 |
| JP | 2006-002075 | A | | 1/2006 |
| JP | 2006-169382 | A | | 6/2006 |
| JP | 2008183802 | A | * | 8/2008 |
| JP | 2015-28154 | A | | 2/2015 |
| JP | 2020-100012 | A | | 7/2020 |
| KR | 2010-0016882 | A | | 2/2010 |
| TW | 201718813 | A | | 6/2017 |
| WO | 2016/063693 | A1 | | 4/2016 |
| WO | 2017/056667 | A1 | | 4/2017 |
| WO | 2021/215081 | A1 | | 10/2021 |

OTHER PUBLICATIONS

Jan. 20, 2025 Office Action and Search Report issued in Taiwanese Patent Application No. 110144778.
Dec. 21, 2021 International Search Report issued in International Patent Application No. PCT/JP2021/042730.
Jun. 13, 2023 International Preliminary Report on Patentability in International Application No. PCT/JP2021/042730.
Oct. 8, 2024 Search Report issued in European Patent Application No. 21903164.8.
Sep. 19, 2023 Office Action issued in Japanese Patent Application No. 2020-205325.
Apr. 16, 2026 Office Action issued in Korean Patent Application No. 10-2023-7018958.

\* cited by examiner

[FIG. 1]
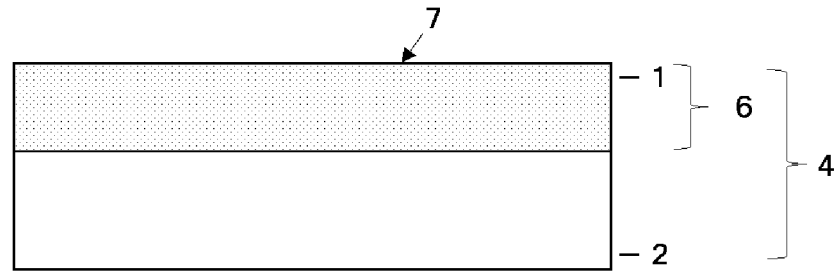
[FIG. 2]
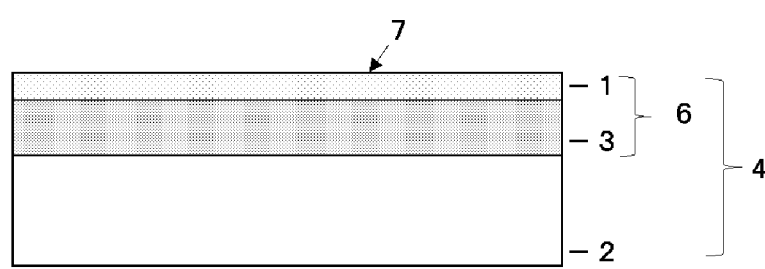
[FIG. 3]
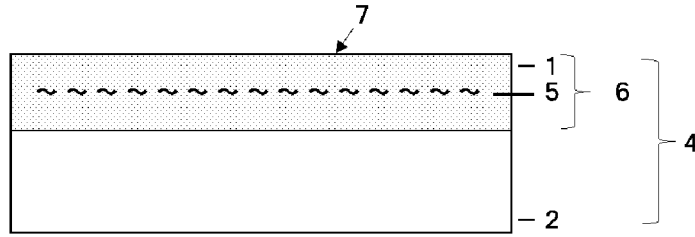

ANTI-FOULING SILICONE COMPOSITE SHEET AND METHOD FOR PERFORMING PREVENTION OF GRAFFITI USING SAME

TECHNICAL FIELD

The present invention relates to an anti-fouling silicone composite sheet and a method for performing prevention of graffiti using the same.

BACKGROUND ART

Cases where graffiti are produced with oil-based paint on surfaces of structure such as piers, fences, and so forth, are raised as social problems. In addition, since such graffiti cannot be removed easily, the removal requires tremendous labors and costs.

The demands for easy and quick graffiti removal have been increasing. For example, Patent Document 1 discloses that after the surface of a concrete structure to be treated is painted with a primer and a clear paint for intermediate coating, a topcoat clear paint having a function to facilitate the removal of graffiti and poster is applied; thereby, graffiti can be removed by attaching a cloth gaffer tape for packaging having been cut to a predetermined length to the surface with graffiti and firmly rubbing the cloth gaffer tape with hand, followed by forcefully peeling off the cloth gaffer tape.

However, since the graffiti removal as described above requires attaching the cloth gaffer tape for packaging having been cut to a predetermined length to the surface with graffiti, firmly rubbing the gaffer tape with hand, and then forcefully peeling off the gaffer tape for packaging, these cause a problem of low operability during the graffiti removal operation.

Hence, to inhibit attachment of graffiti, it has been proposed to form an anti-fouling coating film, for example, by applying a paint containing silicone oil or wax onto those architecture surfaces, or by painting the surfaces with a reactive silicone-based resin paint (see Patent Documents 2 to 4). Moreover, Patent Document 5 proposes a method in which a surface treatment agent containing particular organopolysiloxanes is applied and spread over the coating surface of an automobile or the like to form a coating film enabling easy removal of fouling component attached thereto.

However, the reactive silicone resin-based paint and surface treatment agent as described above have problems that their anti-graffiti performances lower over time, and that when the materials are painted to large thicknesses by roller application or brush application, the coating films dried at normal temperature form cracks over time. Additionally, although these methods enable graffiti removal, graffiti itself is possible. Accordingly, problems occur that graffiti is drawn again after graffiti removal in many cases. In other words, the conventional techniques do not exhibit a function for suppressing "graffiti-drawing action" and hence have a problem that graffiti actions and removals are repeated.

CITATION LIST

Patent Literature

Patent Document 1: JP 2005-262134 A
Patent Document 2: JP H06-182290 A
Patent Document 3: JP H09-94524 A
Patent Document 4: JP H10-216619 A
Patent Document 5: JP 2005-97527 A

SUMMARY OF INVENTION

Technical Problem

As countermeasures to solve the above problems, it is conceivable to provide an anti-fouling layer with a surface having been subjected to anti-fouling treatment. Nevertheless, in view of long-term anti-fouling performance and washability, if an anti-fouling layer has low weather resistance, this brings about problems that the anti-fouling performance and washability are gradually lowered, and the sheet cannot sufficiently exhibit functions of graffiti prevention and simple washing.

Moreover, a general anti-fouling treatment agent has a problem that a fouling cannot be easily removed by a cloth gaffer tape for packaging once the fouling is fixed. Further, there is a problem that the anti-fouling performance becomes lost when wear is generated on the surface.

The present invention has been made in view of such circumstances. An object of the present invention is to provide: an anti-fouling silicone composite sheet capable of exhibiting anti-fouling performance, washability, easiness of washing, and wear resistance stably for a long period, easily attachable to an adherend, and conformable even to cracking and shifting on the application surface; and a method for performing a prevention of graffiti by using the anti-fouling silicone composite sheet.

Solution to Problem

For solving the above problem, the present invention provides an anti-fouling silicone composite sheet comprising: a substrate layer containing a fluororesin; and a silicone adhesive layer stacked on one surface of the substrate layer, having a hardness of 5 or less as measured with an Asker C hardness tester, and having an adhesive force with respect to a mortar test piece of 5 N/25 mm or more, wherein the substrate layer has a surface on which the silicone adhesive layer is stacked and the other surface is an anti-fouling surface.

The inventive anti-fouling silicone composite sheet is capable of exhibiting anti-fouling performance, washability, easiness of washing, and wear resistance stably over a long period, easily attachable to an adherend, and conformable to cracking and shifting on the application surface.

In the present invention, at least the surface opposite to the anti-fouling surface is preferably subjected to anchoring property improving treatment in surfaces of the fluororesin constituting the substrate layer.

Since the fluororesin is a slightly adhesive material, when the fluororesin is stacked with another layer including a silicone adhesive layer, the side of the fluororesin surface to be stacked (surface opposite to an anti-fouling surface) is preferably subjected to treatment for improving anchoring property. The fluororesin having been subjected to such treatment can be easily stacked with the other layer.

In the present invention, further, a reinforcing material is preferably contained in the substrate layer.

Some fluororesin have very high flexibility, and are easily deformed, but if a reinforcing material is contained in the substrate layer, such deformation is difficult to occur.

Also, it is preferable that a reinforcing material layer is further stacked between the substrate layer and the silicone adhesive layer.

Since such a reinforcing material layer supports the substrate layer, a recessed portion is hardly formed in the substrate layer.

In this case, the substrate layer and the reinforcing material layer are preferably stacked via an adhesion layer having a UV resistance property.

The UV resistance property can be improved in such a material.

Moreover, the reinforcing material layer preferably includes a PET film.

Such a material is advantageous in terms of cost, and suitable in terms of availability and easiness of surface treatment.

In the present invention, one or more of the respective layers preferably have an anti-light-reflective effect.

Such materials can suppress optical glare and light reflection in and on the anti-fouling silicone composite sheet, and can protect nearby passers-by from being dazzled.

Preferably, in the present invention, the substrate layer has a thickness of 0.05 to 0.3 mm, the adhesive layer has a thickness of 0.5 to 3 mm, and the anti-fouling silicone composite sheet has a total thickness of 0.55 to 3.3 mm.

Such a configuration makes the attachability and physical strength favorable, and is advantageous in terms of cost.

The anti-fouling silicone composite sheet is preferably for preventing graffiti.

Such an anti-fouling silicone composite sheet is quite suitably utilizable to prevent graffiti.

The present invention also provides a method for performing a prevention of graffiti, including: attaching the silicone adhesive layer of the above-mentioned anti-fouling silicone composite sheet to a certain adherend; and exposing the anti-fouling surface of the substrate layer constituted of the fluororesin to prevent graffiti on the adherend.

According to such a method, by using the inventive anti-fouling silicone composite sheet, the prevention can be performed in a primer-less manner. Thus, even if water remains on the adhesion surface, the method can be carried out only by adequately wiping the surface with a rag, or the like, and therefore, the method can be started immediately after the weather gets better.

Advantageous Effects of Invention

In the inventive anti-fouling silicone composite sheet, a surface opposite to the surface on which the silicone adhesive layer is stacked is an anti-fouling surface, in the surface of the substrate layer, and the substrate layer contains a fluororesin. This makes it possible to prevent a person who tries to write graffiti from writing desired drawing. Moreover, by this effect, a person who tries to write graffiti would lose the motivation for graffiti, so that the graffiti action itself can be suppressed. Further, even if graffiti is drawn, the fluororesin enables graffiti removal easily by washing.

Also, since the surface of the anti-fouling silicone composite sheet is a fluororesin, the weather resistance can be made favorable and the anti-fouling performance, washability, and easiness of washing can be stably kept for a long period.

In addition, the laminated silicone adhesive layer can be easily attached to an adherend, and is conformable to cracking, shifting, asperity, and the like of the application surface. Further, since silicone is the major component, the weather resistance, heat resistance, and cold resistance are excellent, and the function can be retained for a longer period. Furthermore, since the silicone adhesive layer has waterproof effect, it is possible to prevent water infiltration into an application spot, and prevent degradation of the application object, or considerably delay the progress of the degradation.

BRIEF DESCRIPTION OF DRAWINGS

FIG. 1 is a schematic illustration showing an example of the inventive anti-fouling silicone composite sheet.

FIG. 2 is a schematic illustration showing another example of the inventive anti-fouling silicone composite sheet.

FIG. 3 is a schematic illustration showing still another example of the inventive anti-fouling silicone composite sheet.

DESCRIPTION OF EMBODIMENTS

As described above, there have been demands for the development of: an anti-fouling silicone composite sheet which exhibits anti-fouling performance, washability, and easiness of washing stably for a long period, which is easily attached to an adherend, and which is conformable to cracking and shifting on the application surface; and a method for preventing graffiti by using the sheet.

The present inventors made intensive investigations on the above problem, and found that an anti-fouling silicone composite sheet including a substrate layer and a silicone adhesive layer having a hardness of 5 or less as measured with an Asker C hardness tester and having an adhesive force with respect to a mortar test piece of 5 N/25 mm or more, wherein the silicone adhesive layer is laminated on one surface of the substrate layer, and the substrate layer is constituted of a fluororesin, stably exhibits the anti-fouling performance, washability, and easiness of washing for a long period, is easily attached to an adherend, and conformable to cracking or shifting of an application surface. Thereby, the present invention was completed.

That is, the present invention is an anti-fouling silicone composite sheet including: a substrate layer containing a fluororesin; and a silicone adhesive layer stacked on one surface of the substrate layer, having a hardness of 5 or less as measured with an Asker C hardness tester, and having an adhesive force with respect to a mortar test piece of 5 N/25 mm or more, wherein the substrate layer has a surface on which the silicone adhesive layer is stacked and the other surface is an anti-fouling surface.

In addition, the present invention is a method for performing a prevention of graffiti, the method including: attaching the silicone adhesive layer of the anti-fouling silicone composite sheet to a certain adherend; and exposing the anti-fouling surface of the substrate layer made of the fluororesin to prevent graffiti on the adherend.

Hereinafter, the present invention will be described in detail. However, the present invention is not limited thereto.
Anti-Fouling Silicone Composite Sheet The anti-fouling silicone composite sheet of the present invention includes a substrate layer containing a fluororesin; and a silicone adhesive layer stacked on one surface of the substrate layer, having a hardness of or less as measured with an Asker C hardness tester, and having an adhesive force with respect to a mortar test piece of 5 N/25 mm or more, wherein the substrate layer has a surface on which the silicone adhesive layer is stacked and the other surface is an anti-fouling surface.

The anti-fouling silicone composite sheet of the present invention may further include a reinforcing material layer and a protective layer in addition to the substrate layer and the silicone adhesive layer, as described below. Note that, in the following, layers other than the silicone adhesive layer among the respective layers constituting the inventive anti-fouling silicone composite sheet are collectively referred to as "an anti-fouling layer".

Such an anti-fouling silicone composite sheet has the anti-fouling surface on which a fluororesin is exposed, the anti-fouling surface is located on the side opposite to the surface where the silicone adhesive layer is stacked. Thus, it is possible to prevent a person who tries to write graffiti from writing a drawing as desired. Moreover, a person who tries to write graffiti would lose the motivation for graffiti by this effect, so that the graffiti action itself can be suppressed. Further, even when graffiti is drawn, the fluororesin enables the graffiti removable by simple washing. Also, by constituting the substrate layer itself with a fluororesin, the surface of the silicone composite sheet is the fluororesin, so that the anti-fouling performance, washability, easiness of washing, and wear resistance can be stably kept for a long period.

In addition, the silicone adhesive layer stacked with the substrate layer can be easily attached to an adherend, and is conformable to cracking, shifting, asperity, and the like of an application surface. Further, since silicone is the major component, the weather resistance, heat resistance, and cold resistance are excellent, and the function can be retained for a longer period. Furthermore, since the silicone adhesive layer has waterproof effect, it is possible to prevent water infiltration into an application part, and prevent degradation of the application object, or considerably delay the progress of the degradation. The physical properties of the silicone adhesive layer will be described later.

Meanwhile, in order to achieve considerable reduction of the work period, it is necessary to use not a type to be cured at operation site but a type having been prepared into a sheet form before the operation. From this point, the inventive anti-fouling silicone composite sheet has a stacking structure including: a substrate layer; and a silicone adhesive layer molded (stacked) on one surface of the substrate layer, can be stored for a long-term, has the long working life, and enables simple application. Hence, the work period can also be reduced. Note that the silicone adhesive layer is preferably protected with a cover film (protection layer) when the inventive anti-fouling silicone composite sheet is not used or until just before used.

Hereinbelow, the silicone adhesive layer and the substrate layer included in the inventive anti-fouling silicone composite sheet will be described individually.

Silicone Adhesive Layer

The silicone adhesive layer constituting the inventive anti-fouling silicone composite sheet is not particularly limited, as long as its hardness measured with an Asker C hardness tester is 5 or less and its adhesive force with respect to a mortar test piece is 5 N/25 mm or more. The silicone adhesive layer preferably has the following features.

The silicone composition which can be used as the silicone adhesive layer constituting the inventive anti-fouling silicone composite sheet is preferably an addition-curable silicone composition containing the following components (A) to (D) and whose cured product has surface adhesiveness:

(A) an organopolysiloxane containing at least two alkenyl groups bonded to silicon atoms per molecule;

(B) an alkenyl group-containing resinous copolymer mainly containing an $R^2_3SiO_{1/2}$ unit, where $R^2$ represents an unsubstituted or substituted monovalent hydrocarbon group and includes an alkenyl group, and a $SiO_2$ unit, the component (B) being preferably incorporated in the composition, optionally the content being 0 parts by mass.);

(C) an organohydrogenpolysiloxane containing at least two hydrogen atoms bonded to silicon atoms (SiH groups) per molecule; and (D) an addition-reaction catalyst. The silicone adhesive layer is preferably formed from this cured product.

The components (A) to (D) are described in more detail hereinbelow.

Component (A)

In the addition-curable silicone composition, the component (A) is an organopolysiloxane having at least two alkenyl groups in a molecule. As the organopolysiloxane of the component (A), it is possible to use one shown by the following average composition formula (I):

$$R^1_a SiO_{(4-a)/2} \tag{I.}$$

In the formula, $R^1$'s are identical to or different from one another, and are each an unsubstituted or substituted monovalent hydrocarbon group having preferably 1 to 10, more preferably 1 to 8 carbon atoms, and "a" is a positive number in a range of preferably 1.5 to 2.8, more preferably 1.8 to 2.5, and further preferably 1.95 to 2.05. Here, examples of the unsubstituted or substituted monovalent hydrocarbon group represented by $R^1$ and bonded to a silicon atom include alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups, such as a phenyl group, a tolyl group, a xylyl group, and a naphthyl group; aralkyl groups such as a benzyl group, a phenylethyl group, and a phenylpropyl group; alkenyl groups such as a vinyl group, an allyl group, a propenyl group, an isopropenyl group, a butenyl group, a hexenyl group, a cyclohexenyl group, and an octenyl group; groups obtained from these groups by substituting some or all of hydrogen atoms thereof with a halogen atom, such as fluorine, bromine, or chlorine, a cyano group, etc., for example, a chloromethyl group, a chloropropyl group, a bromoethyl group, a trifluoropropyl group, and a cyanoethyl group; etc. Preferably, a methyl group accounts for 90% or more of all $R^1$'s by mole.

In this case, per molecule of the component (A), at least two $R^1$'s are alkenyl groups (each of which preferably has 2 to 8 carbon atoms, further preferably 2 to 6 carbon atoms). Note that alkenyl group content in all the organic groups $R^1$ (i.e., the unsubstituted or substituted monovalent hydrocarbon groups) is preferably 0.00001 to 0.05 mol/g, more preferably 0.00001 to 0.01 mol/g. The alkenyl groups may be bonded to silicon atoms at ends of the molecular chain, may be bonded to silicon atoms in the middle of the molecular chain, or may be bonded at both. Preferably, the organopolysiloxane contains alkenyl groups bonded to at least silicon atoms at both ends of the molecular chain. When the alkenyl group content is 0.00001 mol/g or more, sufficient rubber physical properties are obtained. When the content is 0.05 mol/g or less, the hardness does not become too high, and the adhesive force is kept sufficiently.

The polymerization degree is not particularly limited, and is preferably such that the organopolysiloxane is liquid at normal temperature. Normally, the average polymerization degree of suitably used organopolysiloxane is preferably 50 to 20,000, more preferably 100 to 10,000, further preferably 100 to 2,000 or so, which are in terms of polystyrene according to gel permeation chromatography (GPC).

Moreover, basically, as the structure of this organopolysiloxane of the component (A), it preferably has a linear structure in which the main chain is composed of repeated diorganosiloxane units ($R^1_2SiO_{2/2}$) and both ends of the molecular chain are blocked with triorganosiloxy groups ($R^1_3SiO_{2/2}$) or hydroxydiorganosiloxy groups (($HO)R^1_2SiO_{1/2}$). The structure may partially have a branched structure, cyclic structure, or the like.

Component (B)

The resinous copolymer (i.e., a copolymer having three-dimensional network structure) of the component (B) contains, as the main component, an $R^2_3SiO_{1/2}$ unit and a $SiO_2$ unit. Here, $R^2$ is an unsubstituted or substituted monovalent hydrocarbon group (including an alkenyl group) preferably having 1 to 10 carbon atoms, and particularly preferably having 1 to 8 carbon atoms. Examples of the monovalent hydrocarbon group represented by $R^2$ include alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, a xylyl group, and a naphthyl group; aralkyl groups such as a benzyl group, a phenethyl group, and a phenylpropyl group; alkenyl groups such as a vinyl group, an allyl group, a propenyl group, an isopropenyl group, a butenyl group, a hexenyl group, a cyclohexenyl group, and an octenyl group; and groups obtained from these groups by substituting some or all of hydrogen atoms thereof with a halogen atom, such as fluorine, bromine, or chlorine, a cyano group, etc., for example, a chloromethyl group, a chloropropyl group, a bromoethyl group, a trifluoropropyl group, and a cyanoethyl group; etc.

The resinous copolymer of the component (B) may be composed of only the $R^2_3SiO_{1/2}$ unit and the $SiO_2$ unit, or may contain, as necessary, an $R^2_2SiO$ unit or $R^2SiO_{3/2}$ unit ($R^2$ is as defined above) in the range of 50% or less, more preferably 40% or less as the total amount thereof relative to the total mass of the copolymer. The molar ratio of the $R^2_3SiO_{1/2}$ unit and the $SiO_2$ unit ($R^2_3SiO_{1/2}/SiO_2$) is preferably 0.5 to 1.5, and particularly preferably 0.5 to 1.3. Within this molar ratio range, sufficient rubber hardness and strength may be obtained.

Further, the resinous copolymer of the component (B) has an alkenyl group, preferably at least two alkenyl groups per molecule. The alkenyl group content is preferably 0.0001 mol/g or more, more preferably in a range of 0.0001 to 0.001 mol/g. When the alkenyl group content is 0.0001 mol/g or more, sufficient rubber physical properties are obtained. When the content is 0.001 mol/g or less, the hardness is appropriate and the adhesive force is kept more reliably.

The resinous copolymer of the component (B) may be a liquid having fluidity (for example 10 mPa·s or more, preferably 50 mPa·s or more) or a solid having no fluidity at normal temperature (25° C.). In the case of solid state, it may be dissolved in an organic solvent, such as toluene. This resinous copolymer can be produced normally by hydrolyzing appropriate chlorosilane or alkoxysilane according to a method well-known in this art.

The components (A), (B) are blended in such amounts that where the total of the components (A) and (B) is 100 parts by mass, the component (A) is in a range of preferably 20 to 100 parts by mass, more preferably 20 to 90 parts by mass, particularly preferably 30 to 90 parts by mass; meanwhile, the component (B) is in a range of preferably 0 to 80 parts by mass, more preferably 10 to 80 parts by mass, particularly preferably 10 to 70 parts by mass. When the blending amount of the components (A) and (B) is within the above range, the rubber physical properties are favorable. From the viewpoints of adhesiveness and strength, the components (A) and (B) are preferably used in combination.

Component (C)

The component (C) is an organohydrogenpolysiloxane having at least two, preferably three or more hydrogen atoms bonded to silicon atoms (SiH groups) per molecule. The component (C) acts as a curing agent for curing the composition through crosslinking by hydrosilylation addition reaction between the SiH groups in this molecule and the alkenyl groups bonded to silicon atoms in the components (A) and (B).

As the organohydrogenpolysiloxane of the component (C), it is possible to use one shown by the following average composition formula (II):

$$R^3_bH_cSiO_{(4-b-c)/2} \tag{II}$$

where $R^3$ represents an unsubstituted or substituted monovalent hydrocarbon group having 1 to 10 carbon atoms. Moreover, "b" is 0.7 to 2.1, "c" is 0.001 to 1.0, and b+c is a positive number satisfying 0.8 to 3.0. It is suitable to use the organohydrogenpolysiloxane having at least two (normally 2 to 200), preferably 3 to 100, more preferably 3 to 50, hydrogen atoms bonded to silicon atoms per molecule. Here, examples of the monovalent hydrocarbon group as $R^3$ include those exemplified as $R^1$. Preferably, the monovalent hydrocarbon group has no aliphatic unsaturated group. In addition, "b" is preferably 0.8 to 2.0, "c" is preferably 0.01 to 1.0, and b+c is preferably 1.0 to 2.5. The molecular structure of the organohydrogenpolysiloxane may be any of linear, cyclic, branched, and three-dimensional network structures.

In this case, the number of silicon atoms, or polymerization degree, in a molecule is preferably 2 to 300, and it is particularly suitable to use the component (c) in a liquid state at room temperature (25° C.) with 4 to about 150 silicon atoms. Note that the hydrogen atoms bonded to silicon atoms may be located either at ends of the molecular chain or at the middle of the molecular chain, or may be located at both. Preferably, the silicon-atom-bonded hydrogen atoms are located at ends of the molecular chain because the reaction rate is fast. That is, specific examples of the component (C) include methylhydrogenpolysiloxanes blocked at both ends with trimethylsiloxy groups, dimethylsiloxane-methylhydrogensiloxane copolymers blocked at both ends with trimethylsiloxy groups, dimethylpolysiloxanes blocked at both ends with dimethylhydrogensiloxy groups, dimethylsiloxane-methylhydrogensiloxane copolymers blocked at both ends with dimethylhydrogensiloxy groups, copolymers composed of $(CH_3)_2HSiO_{1/2}$ and $SiO_{4/2}$ units, copolymers composed of $(CH_3)_2HSiO_{1/2}$, $SiO_{4/2}$, and $(C_6H_5)SiO_{3/2}$ units, etc.

The organohydrogenpolysiloxane as the component (C) is blended in an amount of preferably 0.5 to 20 parts by mass, particularly preferably 1.0 to 10 parts by mass, based on 100 parts by mass of the total of the components (A) and (B). When the blend amount is within such ranges, sufficient rubber strength is obtained. Moreover, the organohydrogenpolysiloxane of the component (C) is blended such that the molar ratio of the amount of silicon atom-bonded hydrogen atoms (SiH groups) in the component (C) relative to the silicon atom-bonded alkenyl groups contained in the components (A) and (B) is preferably 0.5 to 1.1, more preferably to 1.0. Simultaneously, the organohydrogenpolysiloxane is preferably blended in an amount of 0.005 to 0.010 mol/g, given that the addition crosslinking reaction progresses 100%.

Now, the molar ratio of the SiH groups of the component (C) relative to the alkenyl group amount present in the system is referred to as H/Vi. Additionally, the following theoretical crosslinking amount refers to a crosslinking amount in a case where silicon atom-bonded hydrogen atoms (SiH groups) in the component (C) added into the system react completely (at 100%) with the alkenyl groups present in the system. Thus, if H/Vi is 1 or less, the SiH group amount is theoretical crosslinking amount; if H/Vi is 1 or more, the alkenyl group amount is the theoretical crosslinking amount. The amounts of these functional groups may be based on the calculation formula in designing the composition, but are more preferably values actually measured. The actual measurements of these functional group amounts can be carried out, for example, by measuring the amount of hydrogen gas generated or unsaturated groups according to known analysis methods, or by NMR analysis. The amount of a functional group in the system can be expressed by X×Y mol/g, where the amount of the functional group in a molecule is represented by X mol/g, and the added amount is represented by Y parts by mass.

Component (D)

The component (D) may be a conventionally known material. Normally, a material containing a platinum-group metal-based addition-reaction catalyst typified by platinum or a platinum compound is used (normally, 1 to 1,000 ppm based on all the alkenyl group-containing organopolysiloxanes of the components (A) and (B) in terms of metal mass).

Other Components

In addition to the above-described components, the composition for forming the silicone adhesive layer may be blended as necessary with other component(s) including: fillers, such as fumed silica, precipitated silica, quartz powders, diatomaceous earth, and calcium carbonate; electroconductive agents, such as carbon black, conductive zinc white, and metal powders; and fillers, such as heat resistant agents including iron oxide and cerium oxide. Further, the composition is optionally blended with: hydrosilylation reaction regulators, such as nitrogen-containing compounds, acetylene compounds, phosphorus compounds, nitrile compounds, carboxylates, tin compounds, mercury compounds, and sulfur compounds; internal release agents, such as dimethylsilicone oil; tackifiers; thixotropic agents; etc.

Physical Properties of Silicone Adhesive Layer

Next, description will be given of the physical properties of the silicone adhesive layer included in the inventive anti-fouling silicone composite sheet.

In the present invention, the silicone adhesive layer has a hardness of 5 or less as measured with an Asker C hardness tester. The hardness is preferably less than the hardness of the substrate layer, more preferably 2 or less, further preferably 1 or less. If the Asker C hardness exceeds 5, the adhesiveness is lowered. Note that the lower limit is 0.

Meanwhile, the hardness of the silicone adhesive layer is further preferably measured in terms of Asker CSR-2 type hardness. In this way, even when the hardness in terms of Asker C hardness is in a range less than 1, the measurement is possible with less variation, and the hardness of the silicone adhesive layer can be evaluated more reliably.

Specifically, the hardness of the silicone adhesive layer is preferably lower than the hardness of the substrate layer, and the hardness measured with a CSR-2 type hardness tester (manufactured by KOBUNSHI KEIKI CO., LTD.) is preferably a positive number of 50 or less. This hardness is more preferably a positive number in a range of 10 or more and 20 or less.

This CSR-2 type hardness tester is suitable for the hardness measurement of Asker C hardness in a range of less than 1. The hardness feeling in this range has such a hardness level that when the adherent surface is touched with a finger and then the finger is slowly moved apart from the adherent surface, the adherent surface follows the finger. The more the adhesive force is made to be large, it is advantageous that the hardness of the adhesive layer is made lower. Meanwhile, with the hardness of 3 or more according to a CSR-2 type hardness tester, even when the anti-fouling silicone composite sheet is pasted on an adherend surface made of a porous material such as asphalt or mortar, the hardness is sufficient, so that a problem that the adhesive layer flows away does not occur. In addition, the operability of pasting operation is not significantly lowered. Meanwhile, the CSR-2 type hardness of 20 or less is preferable because the adhesive force is sufficient large, so that the adhesion to the adherend surface is sufficient. The hardness of the silicone adhesive layer can be easily controlled by controlling molding and curing conditions to be described later.

As an index of the adhesiveness, adhesive force with respect to a mortar test piece is defined. A sheet prepared by a molding method to be described later is cut to have a width of 25 mm, and the adhesive layer side of this sheet is let adhere to a mortar test piece (width 50 mm×length 150 mm×thickness 10 mm, prepared in accordance with JIS R5201, and manufactured by Engineering Test Service Co., Ltd.); after the resultant is left standing for 30 minutes at room temperature, a 180° peal test is conducted at a peel rate of 300 mm/min. In this event, the silicone adhesive layer incorporated in the inventive anti-fouling silicone composite sheet has an adhesive force of 5 N/25 mm or more, preferably 5 to 30 N/25 mm, particularly preferably 10 to 25 N/25 mm. As a standard of the adhesive force, if it is less than 5 N/25 mm with respect to a mortar test piece, the layer is easily peeled even with a weak force by hand. Meanwhile, when the adhesive force is 5 N/25 mm or more, the layer is not easily peeled by hand.

Substrate Layer

The substrate layer incorporated in the inventive anti-fouling silicone composite sheet contains a fluororesin. The substrate layer has an anti-fouling surface which is a surface having anti-fouling function, and this surface is the surface located on the side opposite to the surface where the silicone adhesive layer is stacked.

The anti-fouling surface is the fluororesin, so that it is possible to impart the effect of repelling water-based paint, oil-based paint, or both types to the anti-fouling silicone composite sheet. This effect can suppress drawing desired by a person who tries to write graffiti and can reduce the motivation for graffiti action. Moreover, graffiti can be easily removed by washing with water or solvent, or by wiping, and the restoration to the state before graffiti is easily achieved.

By using the fluororesin having both water-repelling and oil-repelling effects, as the substrate layer itself, the anti-fouling function can be kept stably for a long term. Since the fluororesin has quite high weather resistance, even when the composite sheet is exposed to sunlight for outdoor use or the like, it is possible to prevent degradation of the substrate layer and to suppress decrease in anti-graffiti performance and wear of the substrate layer during repeated washing, too.

In the present invention, the substrate layer itself is made of a fluororesin, and does not include a substrate layer which is not made of a fluororesin but has a fluororesin formed thereon by coating with using a surface treatment agent, or the like. For example, as mentioned below, those obtained by coating a fluororesin on a reinforcing material layer is outside the scope of the present invention.

The fluororesin used in the substrate layer is not particularly limited, and is preferably PTFE (polytetrafluoroethylene), ETFE (ethylene-tetrafluoroethylene copolymer), PFA (perfluoroalkoxyalkane), FEP (perfluoroethylene propene copolymer), more preferably PTFE. Since these resins have higher anti-fouling performance and washability among fluororesins, the anti-fouling effect can be more improved.

The substrate layer is preferably in a shape of film or sheet. Such a layer can be successively processed when the silicone adhesive layer is laminated, and is preferable due to cost advantage.

Examples of the fluororesin include Skied tape MSF manufactured by Chukoh Chemical Industries, Ltd., Chukoh Flo Fabric FGF, or the like.

Since the fluororesin is a slightly adhesive material, when the fluororesin is stacked with other layer to be stacked including a silicone adhesive layer, the side of the fluororesin surface to be stacked is preferably subjected to treatment for improving anchoring property. Specific examples of such a treatment include an etching treatment, corona treatment, EB treatment, plasma treatment, and sand mat treatment. However, as long as the anchoring property is improved by the treatment, the treatment is not limited thereto.

Reinforcing Material and Reinforcing Material Layer

In the present invention, it is also possible to produce an anti-fouling silicone composite sheet further including a reinforcing material in the substrate layer, or an anti-fouling silicone composite sheet in which the reinforcing material layer described below is further stacked between the substrate layer and the silicone adhesive layer.

Some fluororesins have very high flexibility, so that they are easily deformed with a slight pressure in a shape of film or sheet. Therefore, even with a pressure in application or washing graffiti, a recessed portion may be formed to cause accumulation of fouling in that portion, and cleaning may be required. Thus, a reinforcing material such as a film, textile, or metal plate is preferably used for reinforcing the fluororesin to prevent deformation.

Examples of the method for reinforcing the fluororesin include such as an impregnation processing, melt bonding, and adhesion processing, and any processing method can be used if a reinforcing effect is obtained. Also, if there is a reinforcing effect, material or shape of the reinforcing material, and embodiments for compounding with the fluororesin are not particularly limited. Examples of the embodiments for compounding include impregnating and sintering a fluororesin dispersion in a glass cloth or aramid cloth, extrusion molding, and compression molding a fluororesin with a reinforcing material. The shape of the reinforcing material varies depending on the processing method, and examples thereof include plate, film, reticulate, textile, and fibrous shapes. Note that a layered reinforcing material is also referred to as a reinforcing material layer.

Moreover, when the reinforcing material layer is stacked for reinforcement, it is preferable to use an adhesion layer added with a UV resistance compound for attaching the reinforcing material layer to fluororesin (substrate layer). Such a configuration can prevent or considerably delay the degradation of the adhesion layer, and attach the fluororesin to the reinforcing material layer stably for a long term. Further, the reinforcing material is preferably a UV-resistance-treated material. Specific examples thereof include material kneaded with a UV resistance agent and a film subjected to UV resistance coating treatment.

Furthermore, a film having a surface roughness Ra of 0.00 to 1.00 μm is preferably adhered to the reinforcing material layer for obtaining smooth surface of the fluororesin film. The film preferably used is a PEN film, PC film, PEEK film, PET film, or the like in view of cost, availability, easiness of surface treatment, etc. Among them, a PET film is more preferably used.

Hereinbelow, some embodiments of the inventive anti-fouling silicone composite sheet will be described.

In the inventive anti-fouling silicone composite sheet, one or more layers constituting the anti-fouling silicone composite sheet including the substrate layer, reinforcing material layer, and the silicone adhesive layer preferably have an anti-light-reflective effect. Having an anti-light-reflective effect can suppress optical glare and light reflection in and on the anti-fouling composite sheet, and can protect nearby passers-by from being dazzled.

Examples of the method of imparting the anti-light-reflective effect include kneading a filler into the substrate layer, the reinforcing material layer, or the adhesive layer, attaching the substrate layer to the reinforcing material layer using an adhesive containing a filler, etc.

Regarding the thickness of the anti-fouling silicone composite sheet, the substrate layer preferably has a thickness (when a reinforcing material layer is included, the total thickness thereof) of 0.05 to 0.3 mm, the adhesive layer preferably has a thickness of 0.5 to 3 mm, and the composite sheet preferably has a total thickness of 0.55 to 3.3 mm.

When the total thickness of the substrate layer and the reinforcing material layer is 0.05 mm or more, the anti-fouling silicone composite sheet has sufficient stiffness and favorable attachability and physical strength. Meanwhile, when the thickness is 0.3 mm or less, the stiffness becomes appropriate and facilitates the attachment to curved surfaces. Moreover, it is advantageous in terms of cost.

In addition, when the thickness of the fluororesin serving as the substrate layer is too thin, the wear resistance is reduced, and when it is too thick, cost becomes high. Therefore, the thickness of the fluororesin is preferably 0.01 mm to 0.10 mm.

The thickness of the silicone adhesive layer is preferably in a range of 0.5 to 3 mm, more preferably in a range of 0.5 to 2 mm. When the thickness is 0.5 mm or more, the silicone adhesive layer can more reliably absorb the asperity of the adherend attachment surface. When the thickness is 3 mm or less, the dependency of the rubber strength of the attachment surface to the adhesive layer is low, so that the rubber destruction does not occur.

The anti-fouling silicone composite sheet as described above is preferably used to prevent graffiti. Such an anti-fouling silicone composite sheet is quite suitably utilizable to prevent graffiti.

Method for Forming Anti-Fouling Silicone Composite Sheet

A method for forming the anti-fouling silicone composite sheet will be described. Nevertheless, the method for forming the inventive anti-fouling silicone composite sheet is not limited to methods described below.

First, a fluororesin film serving as the substrate layer and a PET film or the like serving as the reinforcing material layer are attached together using various methods such as dry laminate, wet laminate, or adhesive processing to form the anti-fouling layer. More preferably, treatment for improving the anchoring property or anti-light reflection treatment is performed on the fluororesin film, and UV resistance treatment or anti-light reflection treatment is performed on the PET film as necessary.

When the silicone adhesive layer is stacked on the anti-fouling layer, the silicone adhesive layer is subjected to a method such as dipping, coating, or screen printing on the anti-fouling layer, so that the anti-fouling silicone composite sheet is obtained. Coating process is easily employable and preferable. Note that these curing conditions preferably range from to 250° C. and 10 seconds to 1 hour. Further, for the purposes of removing low-molecular-weight components and enhancing the film strength, for example, the anti-fouling silicone composite sheet may be conserved at room temperature to 40° C. for 1 to 7 days or so, or may be post-cured at 60° C. to 150° C. for 10 to 60 minutes or so.

Next, specific examples of the inventive anti-fouling silicone composite sheet will be described with reference to the drawings.

FIG. 1 schematically shows an example of the inventive anti-fouling silicone composite sheet. An anti-fouling silicone composite sheet 4 shown in FIG. 1 is obtained by stacking a silicone adhesive layer 2 to a substrate layer 1 made of a fluororesin. In this case, the substrate layer 1 corresponds to an anti-fouling layer 6. In the substrate layer 1, a surface opposite to the surface where the silicone adhesive layer 2 is stacked is an anti-fouling surface 7. The anti-fouling silicone composite sheet 4 is attached such that the adhesive layer covers, in a liquid-tight manner, at least a portion of a structure having a concrete structure, mortar structure, metallic structure, or the like, and therefore, the anti-fouling silicone composite sheet 4 has simplicity and adhesiveness reliability for a long period, and is effectively used to prevent water infiltration and prevent degradation of the target object or delay the degradation over time.

FIG. 2 schematically shows another example of the inventive anti-fouling silicone composite sheet. Description overlapped with that of FIG. 1 is omitted. The anti-fouling silicone composite sheet 4 shown in FIG. 2 is obtained by further stacking a reinforcing material layer 3 between the substrate layer 1, the surface of which is made of a fluororesin, and the silicone adhesive layer 2. In this case, the substrate layer 1 and the reinforcing material layer 3 correspond to the anti-fouling layer 6. The reinforcing material layer 3 may be stacked on a surface of the substrate layer 1 which has been subjected to the anchoring property improving treatment (the surface opposite to the anti-fouling surface 7), and further the silicone adhesive layer 2 may be stacked on the reinforcing material layer 3. Alternatively, the substrate layer 1 and the reinforcing material layer 3 may be stacked via an adhesion layer which is not shown. The substrate layer and the reinforcing material layer are preferably stacked via an adhesion layer having UV resistance property. In this embodiment, the reinforcing material layer 3 imparts the anti-fouling silicone composite sheet 4 with physical properties so as to have high strength. The anti-fouling silicone composite sheet 4 has an effect of preventing graffiti or easily removing graffiti for a longer period, and can stably exhibit anti-fouling properties.

FIG. 3 schematically shows still another example of the inventive anti-fouling silicone composite sheet. The anti-fouling silicone composite sheet 4 shown in FIG. 3 contains a reinforcing material 5 in the substrate layer 1. In this case, the substrate layer 1 including the reinforcing material 5 corresponds to the anti-fouling layer 6. In such an embodiment as well, the reinforcing material 5 imparts high strength to the anti-fouling silicone composite sheet 4, so that the sheet can have the above-mentioned effects and stably exhibit anti-fouling properties.

As described above, the inventive anti-fouling silicone composite sheet is particularly excellent for preventing graffiti.

Method for Performing Prevention of Graffiti

The inventive method for preforming prevention of graffiti is characterized by: attaching the silicone adhesive layer of the inventive anti-fouling silicone composite sheet to a certain adherend; and exposing the anti-fouling surface of the substrate layer made of a fluororesin (the anti-fouling treated surface) to prevent graffiti on the adherend.

The inventive anti-fouling silicone composite sheet having been described above can be used to prevent graffiti by attaching the adhesive layer to a target object (adherend). Now, an exemplary method thereof will be described.

For the attaching of the anti-fouling silicone composite sheet, an attaching portion of an adherend may be pre-treated to facilitate the attaching of the sheet. Nevertheless, since the anti-fouling silicone composite sheet itself has adhesiveness, the pre-treatment on the attaching portion is not always essential. The attaching is performed such that the silicone adhesive layer serving as the adherent surface of the anti-fouling silicone composite sheet faces the attaching side. In a case where the boundary portion on the adherend surface has such a step that the excessive stress is conceivably applied to the attaching surface, it is preferable to provide means for eliminating the step. For example, there is a method in which a backup material is used in the step.

Although it is not always essential to use a sealing material in pasting the anti-fouling composite sheet, a sealing material may be used at a boundary portion of the sheet to ensure more firm pasting or to simultaneously impart waterproof function. Note that the sealing material is not particularly limited, and any known one such as silicone-based, polysulfide-based, and polyurethane-based sealing materials are usable. From the viewpoint of affinity with the composite sheet material of the present invention, a silicone sealing material is suitably used. As such a sealing material, a commercially-available product may be used. For example, as the silicone sealing material, it is possible to use Sealant Master 300, Sealant 70, Sealant 701, and the like manufactured by Shin-Etsu Chemical Co., Ltd.

In the inventive method for performing prevention of graffiti, the use of the inventive anti-fouling silicone composite sheet having adhesiveness enables primer-less application and makes it possible to considerably shorten the application period.

In many conventional techniques, anti-fouling coating films are formed by applying a paint containing silicone oil or wax to architecture surfaces or by painting the surfaces with a reactive silicone-based resin paint, for example, and moreover, a method is employed in which an anti-fouling film is attached using a primer or the like. However, there is a problem that when the water content is high and condensation and the like occur due to temperature difference by climate, weather, particularly rain, snow, etc., the application is impossible until the application surface is dried. The use of the inventive anti-fouling silicone composite sheet enables primer-less application, and therefore, the present invention has astonishing features that even when water remains on the adhesion surface, the application is possible only by adequate wiping with a wiping rag or the like, and the application can be started immediately after the weather gets better.

The inventive anti-fouling silicone composite sheet itself exhibits attachment function and shape keeping function owing to the adhesive force. Accordingly, the peeling is possible without damaging the adherend after use. Further, in a case where the anti-fouling composite sheet has transparency, the inside can be observed without peeling the sheet. Additionally, the ability to exhibit the attachment function owing to the adhesive force again after the reattachment is also remarkable feature.

As described above, the inventive anti-fouling silicone composite sheet has the surface of a fluororesin which is located on the side opposite to the surface where the silicone adhesive layer is stacked, so that the sheet itself has anti-fouling performance. Thus, it is possible to prevent a person who tries to write graffiti from writing a drawing as desired. By this effect, a person who tries to write graffiti would lose the motivation for graffiti, so that the graffiti action itself can be suppressed. Further, even when graffiti is drawn, the graffiti can be easily washed and removed.

In addition, the silicone adhesive layer stacked on the substrate layer can be easily attached to an adherend, and can follow cracking or shifting of the application surface. Further, since silicone is the main component, the weather resistance, heat resistance, and cold resistance are excellent, and the function can be retained for a longer period. Furthermore, since the silicone adhesive layer has waterproof effect, it is possible to prevent water infiltration into an application spot, prevent degradation of the application object, or considerably delay the progress of the degradation.

Also, due to properties of the fluororesin itself, the weather resistance can be made favorable and the anti-fouling performance, washability, and easiness of washing can be stably kept for a long period. In addition, since the thickness of the fluororesin serving as the substrate layer is large, the wear resistance is also excellent.

EXAMPLE

Hereinafter, the present invention will be specifically described by way of Examples and Comparative Examples, but the present invention is not limited thereto. Note that, in the following examples, part(s) mean part(s) by mass. The average polymerization degree, hardness, and adhesive force were measured by the above-described method.

Example 1

A fluororesin film with a thickness of 0.05 mm (PTFE, Chukoh Flo Skived tape MSF-100 manufactured by Chukoh Chemical Industries, Ltd.) was provided for use as the substrate layer A.

Meanwhile, a 50-mass %-toluene solution containing 92.5 parts of dimethylpolysiloxane blocked at both ends with dimethylvinylsiloxy groups and having an average polymerization degree of 1,000, and 7.5 parts of a resinous copolymer which was solid at room temperature (25° C.) and composed of $(CH_2=CH)$ $(CH_3)_2SiO_{1/2}$ unit, $(CH_3)_3$ $SiO_{1/2}$ unit, and $SiO_2$ unit $[((CH_2=CH)$ $(CH_3)_2SiO_{1/2}$ unit+ $(CH_3)_3SiO_{1/2}$ unit)/$SiO_2$ unit (molar ratio)=0.85, $CH_2=CH—$ group content: 0.0008 mol/g] was put into a stirring mixer and mixed for 30 minutes. Then, the toluene was completely distilled off (alkenyl group amount: 0.00865 mol/g). To 100 parts of this silicone base, 6.0 parts of a SiH group-containing resinous copolymer mainly containing $(CH_3)_2HSiO_{1/2}$ unit and $SiO_2$ unit (SiH group amount: 0.0013 mol/g) as a crosslinking agent and 0.1 parts of ethynylcyclohexanol as a reaction regulator were added. Stirring was continued for 15 minutes. Thereby, a silicone rubber composition A was obtained. This silicone rubber composition was mixed with 0.2 parts of a platinum catalyst (Pt concentration: 1 mass %). Thus, an adhesive silicone composition A was obtained.

On the substrate layer A (anti-fouling layer A), 1.0 mm of the adhesive silicone composition A was stacked as a coating by using a comma coater, and cured by heating in a heating furnace at 140° C. for 5 minutes to form a silicone adhesive layer. Thus, an anti-fouling silicone composite sheet A was obtained. The obtained anti-fouling silicone composite sheet A had an average thickness of 1.06 mm.

Moreover, the physical properties of the silicone adhesive layer of the obtained anti-fouling silicone composite sheet A were measured. The silicone adhesive layer had an Asker C hardness of less than 1, and an Asker CSR-2 type hardness of 13. Further, the adhesive force with respect to a mortar test piece (shown as "adhesive force with respect to mortar" in Table 1) measured by the aforementioned method was 18 N/25 mm.

Table 1 shows the results of evaluating the anti-fouling silicone composite sheet A by the methods described later. The evaluation methods in the following Examples and Comparative Examples are the same as those in Example 1.

Example 2

For using as the substrate layer, a fluororesin film (ETFE, Chukoh Flo Skived tape MSF-102 manufactured by Chukoh Chemical Industries, Ltd.) with a thickness of 0.05 mm, one surface of which has been etching-treated and imparted with anchoring property, was provided for use as the substrate layer B.

On the etching-treated surface of substrate layer B (anti-fouling layer B), 1.0 mm of the adhesive silicone composition A was stacked as a coating by using a comma coater, and cured by heating in a heating furnace at 140° C. for 5 minutes to form a silicone adhesive layer. Thus, an anti-fouling silicone composite sheet B was obtained. The obtained anti-fouling silicone composite sheet B had an average thickness of 1.05 mm.

Moreover, the physical properties of the silicone adhesive layer of the obtained anti-fouling silicone composite sheet B were measured. The silicone adhesive layer had an Asker C hardness of less than 1, and an Asker CSR-2 type hardness of 13. Further, the adhesive force with respect to a mortar test piece (shown as "adhesive force with respect to mortar" in Table 1) measured by the aforementioned method was 19 N/25 mm.

Table 1 shows the results of evaluating the anti-fouling silicone composite sheet B by the methods described later.

Example 3

A fluororesin film with a thickness of 0.05 mm, one surface of which has been etching-treated and imparted with anchoring property (ETFE, Chukoh Flo Skived tape MSF-102 manufactured by Chukoh Chemical Industries, Ltd.), and a PET film with a thickness of 0.1 mm used as the reinforcing material layer were provided. Moreover, an etching-treated surface of the fluororesin film and the PET film were attached together by applying a polyester-based adhesive blended with an inorganic UV absorption filler so as to be 3 g/m 2 using a gravure coater to prepare an anti-fouling layer C having an adhesion strength of the fluororesin film and PET film of 5 N/25 mm.

On the reinforcing material layer of the anti-fouling layer C, 1.0 mm of the adhesive silicone composition A was stacked as a coating by using a comma coater, and cured by heating in a heating furnace at 140° C. for 5 minutes to form a silicone adhesive layer. Thus, an anti-fouling silicone composite sheet C was obtained. The obtained anti-fouling silicone composite sheet C had an average thickness of 1.15 mm.

Moreover, the physical properties of the silicone adhesive layer of the obtained anti-fouling silicone composite sheet C were measured. The silicone adhesive layer had an Asker C hardness of less than 1, and an Asker CSR-2 type hardness of 14. Further, the adhesive force with respect to a mortar test piece (shown as "adhesive force with respect to mortar" in Table 1) measured by the aforementioned method was 20 N/25 mm.

Example 4

A fluororesin film with a thickness of 0.05 mm, one surface of which has been etching-treated and imparted with anchoring property (ETFE, Chukoh Flo Skived tape MSF-102 manufactured by Chukoh Chemical Industries, Ltd.), and a UV-resistance-PET film with a thickness of 0.1 mm used as the reinforcing material layer were provided. Moreover, an etching-treated surface of the fluororesin film and the a UV-resistance-PET film were attached together by applying a polyester-based adhesive blended with an inorganic UV absorption filler so as to be 3 g/m 2 using a gravure coater to prepare an anti-fouling layer D having an adhesion strength of the fluororesin film and UV-resistance-PET film of 5 N/25 mm.

On the reinforcing material layer of the anti-fouling layer D, 1.0 mm of the adhesive silicone composition A was stacked as a coating by using a comma coater, and cured by heating in a heating furnace at 140° C. for 5 minutes to form a silicone adhesive layer. Thus, an anti-fouling silicone composite sheet D was obtained. The obtained anti-fouling silicone composite sheet D had an average thickness of 1.14 mm.

Moreover, the physical properties of the silicone adhesive layer of the obtained anti-fouling silicone composite sheet D were measured. The silicone adhesive layer had an Asker C hardness of less than 1, and an Asker CSR-2 type hardness of 13. Further, the adhesive force with respect to a mortar test piece (shown as "adhesive force with respect to mortar" in Table 1) measured by the aforementioned method was 17 N/25 mm.

Comparative Example 1

A UV-resistance-PET film with a thickness of 0.1 mm was provided for use as the substrate layer. Further, a surface treatment solution was prepared by adding and mixing: 100 parts by mass of a silicone hard coating agent containing a fluorine-containing silicone compound, KR-400F manufactured by Shin-Etsu Chemical Co., Ltd., as the surface treatment agent; and 0.05 parts by mass of FA-600 manufactured by Shin-Etsu Chemical Co., Ltd. as a defoamer. After the UV-resistance-PET film was spin-coated with this surface treatment solution, the surface treatment solution was cured at 120° C. for 5 minutes to form a film. Thereby, an anti-fouling layer E subjected to anti-fouling treatment was prepared.

On the surface of the anti-fouling layer E which was not subjected to anti-fouling treatment, 1.0 mm of the adhesive silicone composition A was stacked as a coating by using a comma coater, and cured by heating in a heating furnace at 140° C. for 5 minutes to form a silicone adhesive layer. Thus, an anti-fouling silicone composite sheet E was obtained. The obtained anti-fouling silicone composite sheet E had an average thickness of 1.10 mm.

Moreover, the physical properties of the silicone adhesive layer of the obtained anti-fouling silicone composite sheet E were measured. The silicone adhesive layer had an Asker C hardness of less than 1, and an Asker CSR-2 type hardness of 13. Further, the adhesive force with respect to a mortar test piece was 20 N/25 mm.

Comparative Example 2

An anti-fouling silicone composite sheet F with an average thickness of 1.10 mm was obtained in the same manner as in Example 1 except that a 0.1-mm-thick untreated PET film (anti-fouling layer F) not subjected to anti-fouling treatment unlike Examples 1 and 2 was used as the substrate layer.

Moreover, the physical properties of the silicone adhesive layer of the obtained anti-fouling silicone composite sheet F were measured. The silicone adhesive layer had an Asker C hardness of less than 1, and an Asker CSR-2 type hardness of 14. Further, the adhesive force with respect to a mortar test piece was 19 N/25 mm.

Comparative Example 3

The anti-fouling layer C was obtained in the same manner as in Example 3.

Meanwhile, a 50-mass %-toluene solution containing 92.5 parts of dimethylpolysiloxane blocked at both ends with dimethylvinylsiloxy groups and having an average polymerization degree of 1,000, and 7.5 parts of a resinous copolymer which was solid at room temperature (25° C.) and composed of $(CH_2 = CH)$ $(CH_3)_2SiO_{1/2}$ unit, $(CH_3)_3$ $SiO_{1/2}$ unit) unit, and $SiO_2$ unit $[((CH_2 = CH) (CH_3)_2SiO_{1/2}$ unit+$(CH_3)_3SiO_{1/2}$ unit)/$SiO_2$ unit (molar ratio)=0.85, $CH_2 = CH$-group content: 0.0008 mol/g] was put into a stirring mixer and mixed for 30 minutes. Then, the toluene was completely distilled off (alkenyl group amount: 0.00865 mol/g). To 100 parts of this silicone base, 8.0 parts of a SiH group-containing resinous copolymer mainly containing $(CH_3)_2HSiO_{1/2}$ unit and $SiO_2$ unit (SiH group amount: 0.0013 mol/g) as a crosslinking agent and 0.1 parts of ethynylcyclohexanol as a reaction regulator were added. Stirring was continued for 15 minutes. Thereby, a silicone rubber composition B was obtained. This silicone rubber composition was mixed with 0.2 parts of a platinum catalyst (Pt concentration: 1 mass %). Thus, an adhesive silicone composition B was obtained.

On the reinforcing material layer of the anti-fouling layer C, 1.0 mm of the adhesive silicone composition B was stacked as a coating by using a comma coater, and cured by heating in a heating furnace at 140° C. for 5 minutes to form a silicone adhesive layer. Thus, an anti-fouling silicone composite sheet G with an average thickness of 1.15 mm was obtained.

Moreover, the physical properties of the silicone adhesive layer of the obtained anti-fouling silicone composite sheet G were measured. The silicone adhesive layer had an Asker C hardness of 22, and an Asker CSR-2 type hardness of 76. Further, the adhesive force with respect to a mortar test piece was 2 N/25 mm.

Comparative Example 4

The anti-fouling layer C was obtained in the same manner as in Example 3.

On the reinforcing material layer of the anti-fouling layer C, 2.0 mm of the adhesive silicone composition B was stacked as a coating by using a comma coater, and cured by heating in a heating furnace at 140° C. for 5 minutes to form a silicone adhesive layer. Thus, an anti-fouling silicone composite sheet H with an average thickness of 2.16 mm was obtained.

Moreover, the physical properties of the silicone adhesive layer of the obtained anti-fouling silicone composite sheet H were measured. The silicone adhesive layer had an Asker C hardness of 21, and an Asker CSR-2 type hardness of 72. Further, the adhesive force with respect to a mortar test piece was 3 N/25 mm.

Evaluation Items

Composite-sheet evaluation items and their evaluation methods are described below. Hereinafter, the anti-fouling silicone composite sheet in each example is simply referred to as "anti-fouling silicone composite sheet".

Anti-Fouling Performance

The anti-fouling surface of each anti-fouling silicone composite sheet was sprayed with one of an oil-based lacquer spray and a water-based lacquer spray for 3 seconds to check the repellency. The sheets were rated as "poor" if repelling did not occur and the sprayed portion remained the same. The sheets were rated as "good" if the spray fell off and the spray shape collapsed. The sheets were rated as "moderate" if the spray partially fell off. The sheet which was not evaluated was rated as "-". The test was conducted twice; one was conducted when the sheets were in the initial states, and the other was conducted after a xenon-arc-accelerated exposure test (1000-hour aging). The xenon-arc-accelerated exposure test was in accordance with Method A of JIS K 7350-2.

Repeated Washability

The anti-fouling surface of each anti-fouling silicone composite sheet was sprayed with one of an oil-based lacquer spray and a water-based lacquer spray for 3 seconds, and dried at room temperature for 6 hours. Then, stain transfer washing was performed using the adherent surface of an adhesive tape. The spraying and the transfer washing were repeated five times. The sheets were rated as "poor" if the transfer washing was impossible. The sheets were rated as "good" if the transfer washing was possible. The sheet which was not evaluated was rated as "-". The test was conducted twice; one was conducted when the sheets were in the initial states, and the other was conducted after a xenon-arc-accelerated exposure test (1000-hour aging). The xenon-arc-accelerated exposure test was in accordance with Method A of JIS K 7350-2.

Easiness of Washing

The anti-fouling surface of each anti-fouling silicone composite sheet was sprayed with one of an oil-based lacquer spray and a water-based lacquer spray for 3 seconds, and dried at room temperature for 6 hours. Then, stain transfer washing was performed using the adherent surface of an adhesive tape. The sheets were rated as "good" if almost all lacquer spray could be removed with a number of the stain transfer washing of 5 or less. The sheets were rated as "moderate" if almost all lacquer spray could be removed with a number of the stain transfer washing of 10 or less. The sheets were rated as "poor" if further more washing was required or the lacquer spray could not be removed. The sheet which was not evaluated was rated as "-". The test was conducted twice; one was conducted when the sheets were in the initial states, and the other was conducted after a xenon-arc-accelerated exposure test (1000-hour aging). The xenon-arc-accelerated exposure test was in accordance with Method A of JIS K 7350-2.

Wear Resistance

The substrate layer of the anti-fouling silicone sheet was slightly scraped with a sand paper with fine grit to evaluate the initial samples for the anti-fouling performance, repeated washability, and easiness of washing by the above-mentioned method.

Adhesiveness and Conformability

A composite sheet sample with a shape of 50 mm×100 mm was cut out from each anti-fouling silicone composite sheet. The adhesive layer of this composite sheet sample was attached to one surface of each of two adjoining mortar test pieces such that the areas of portions of the mortar test pieces where the composite sheet sample was attached were equal. The resultant was left standing for 24 hours at room temperature and pulled to the maximum of 20 mm from zero span. The samples were rated as "good" if the displacement of the sheet without peeling but following the mortar test pieces was 10 mm or more. The samples were rated as "moderate" if the displacement was 5 to 10 mm. The samples were rated as "poor" if the displacement was less than 5 mm.

Measurement apparatus: SHIMADZU AUTOGRAPH

Tensile speed: 50 mm/min.

Mortar test piece shape: 50 mm×72 mm×thickness 10 mm

TABLE 1

| | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Anti-fouling silicone composite sheet | | Anti-fouling silicone composite sheet A | Anti-fouling silicone composite sheet B | Anti-fouling silicone composite sheet C | Anti-fouling silicone composite sheet D | Anti-fouling silicone composite sheet E | Anti-fouling silicone composite sheet F | Anti-fouling silicone composite sheet G | Anti-fouling silicone composite sheet H |
| Anti-fouling layer | | Anti-fouling layer A | Anti-fouling layer B | Anti-fouling layer C | Anti-fouling layer D | Anti-fouling layer E | Anti-fouling layer F | Anti-fouling layer C | Anti-fouling layer C |
| Substrate layer | Resin | Fluoro-resin | Fluoro-resin | Fluoro-resin | Fluoro-resin | UV resistance-PET/coating | PET | Fluoro-resin | Fluoro-resin |
| | Anchoring property | Not imparted | Imparted | Imparted | Imparted | — | — | Imparted | Imparted |
| Reinforcing material layer | | None | None | PET | UV resistance-PET | None | None | PET | PET |

TABLE 1-continued

| | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Adhesive layer | | Adhesive silicone composition A | Adhesive silicone composition A | Adhesive silicone composition A | Adhesive silicone composition A | Adhesive silicone composition A | Adhesive silicone composition A | Adhesive silicone composition B | Adhesive silicone composition B |
| Thickness (mm) | | 1.06 | 1.05 | 1.15 | 1.14 | 1.10 | 1.10 | 1.15 | 2.16 |
| Anti-fouling property | Initial | Moderate | Moderate | Moderate | Moderate | Good | Poor | Moderate | Moderate |
| | After exposure | Moderate | Moderate | Moderate | Moderate | Moderate | — | Moderate | Moderate |
| Repeated washability | Initial | Good | Good | Good | Good | Good | Poor | Good | Good |
| | After exposure | Good | Good | Good | Good | Good | — | Good | Good |
| Easiness of washing | Initial | Good | Good | Good | Good | Good | Poor | Good | Good |
| | After exposure | Good | Good | Good | Good | Moderate | — | Good | Good |
| Wear resistance | Anti-fouling property | Moderate | Moderate | Moderate | Moderate | Poor | — | Moderate | Moderate |
| | Repeated washability | Good | Good | Good | Good | Poor | — | Good | Good |
| | Washing easiness | Good | Good | Good | Good | Poor | — | Good | Good |
| Hardness: Asker C | | Less than 1 | Less than 1 | Less than 1 | Less than 1 | Less than 1 | Less than 1 | 22 | 21 |
| Hardness: Asker CSR-2 | | 13 | 13 | 14 | 13 | 13 | 14 | 76 | 72 |
| Adhesive force with respect to mortar (N/25 mm) | | 18 | 19 | 20 | 17 | 20 | 19 | 2 | 3 |
| Adhesiveness/Conformability | | Good | Good | Good | Good | Good | Good | Poor | Moderate |
| Displacement (mm) | | 20 | 20 | 20 | 20 | 20 | 20 | 2 | 5 |

In Examples 1 to 4, the repeated washability and easiness of washing were favorable over long term, the anti-fouling performance was sufficient, and the adhesiveness and conformability were also favorable. Particularly, because the displacement of the sheets was 10 mm or more, the sheets are excellent in conformability to cracking and shifting on the application surface. Moreover, in Examples 3 and 4, deformation of the substrate layer caused by stress was suppressed by the effect of the reinforcing material layer, and the smoothness of the surface (anti-fouling surface) of the anti-fouling silicone composite sheet was more favorable. On the other hand, in Comparative Example 1, the substrate layer subjected to anti-fouling treatment with a silicone hard coating agent containing a fluorine-containing silicone compound was used, so that the anti-fouling performance, repeated washability, and easiness of washing were initially favorable, but the anti-fouling performance and easiness of washing were lowered after the xenon-arc-accelerated exposure test. In addition, wear resistance was also poor. In Comparative Example 2, a resin having no anti-fouling performance (PET) was used as the substrate layer, so that the anti-fouling performance and repeated washability were poor. Furthermore, in Comparative Examples 3 and 4, the anti-fouling performance was provided and the repeated washability were favorable over long term; however, since the hardness of the silicone adhesive layer was too high and the adhesive force was low, the adhesiveness and conformability were poor.

From the foregoing, it was revealed that the inventive anti-fouling silicone composite sheets are capable of keeping excellent anti-fouling performance, repeated washability, and easiness of washing for a long term, excellent in wear resistance, easily attachable to an adherend, and conformable even to cracking and shifting on the application surface. In particular, as can be understood by the results of Comparative Example 1, in the case where a fluororesin is formed by coating using a surface treatment agent or the like (that is, a sheet having a fluororesin coating as a substrate layer on a reinforcing material layer which is non-fluororesin), when adhesion of the coating layer (fluororesin) and its underlayer (reinforcing material layer) is insufficient, and the coating layer is thin, the coating layer is easily peeled off and also easily damaged. Even when thickness of the coating layer is increased, due to a difference of the thermal expansion coefficient in the coating layer and its underlayer (reinforcing material layer), there is a problem that the layers are easily separated by the temperature difference. Therefore, the problem of the present invention cannot be solved. Meanwhile, in the present invention, the substrate layer itself contains a fluororesin, and thus the above problem does not occur. As described above, the substrate layer of the present invention is quite different from those on which a fluororesin is formed by coating.

Moreover, since the adhesive layers of the inventive anti-fouling silicone composite sheets contain silicone as the main component, the weather resistance, heat resistance, and cold resistance are excellent, and the function can be kept for a longer period. Further, since the silicone adhesive layer has waterproof effect, it is possible to prevent water infiltration into the application spot, and prevent degradation of the application object or considerably delay the degradation progress.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. An anti-fouling silicone composite sheet comprising: a substrate layer containing a fluororesin; and a silicone adhesive layer stacked on one surface of the substrate layer, having a hardness of 5 or less as measured with an Asker C hardness tester, and having an adhesive force with respect to a mortar test piece of 5 N/25 mm or more, wherein the substrate layer has a surface on which the silicone adhesive layer is stacked and the other surface is an anti-fouling surface, the fluororesin is as the substrate layer itself, at least the surface opposite to the anti-fouling surface is subjected to anchoring property improving treatment in surfaces of the fluororesin constituting the substrate layer.

2. The anti-fouling silicone composite sheet according to claim 1, further comprising a reinforcing material in the substrate layer.

3. The anti-fouling silicone composite sheet according to claim 2, wherein a reinforcing material layer is further stacked between the substrate layer and the silicone adhesive layer.

4. The anti-fouling silicone composite sheet according to claim 3, wherein the substrate layer and the reinforcing material layer are stacked via an adhesion layer having a UV resistance property.

5. The anti-fouling silicone composite sheet according to claim 3, wherein the reinforcing material layer comprises a PET film.

6. The anti-fouling silicone composite sheet according to claim 1, wherein a reinforcing material layer is further stacked between the substrate layer and the silicone adhesive layer.

7. The anti-fouling silicone composite sheet according to claim 6, wherein the substrate layer and the reinforcing material layer are stacked via an adhesion layer having a UV resistance property.

8. The anti-fouling silicone composite sheet according to claim 7, wherein the reinforcing material layer comprises a PET film.

9. The anti-fouling silicone composite sheet according to claim 6, wherein the reinforcing material layer comprises a PET film.

10. The anti-fouling silicone composite sheet according to claim 1, wherein one or more of the respective layers have an anti-light-reflective effect.

11. The anti-fouling silicone composite sheet according to claim 1, wherein a thickness of the substrate layer is 0.05 to 0.3 mm, a thickness of the adhesive layer is 0.5 to 3 mm, and a total thickness of the anti-fouling silicone composite sheet is 0.55 to 3.3 mm.

12. A method for performing a prevention of graffiti, comprising: attaching the silicone adhesive layer of the anti-fouling silicone composite sheet according to claim 1 to a certain adherend; and exposing the anti-fouling surface of the substrate layer constituted of the fluororesin to prevent graffiti on the adherend.

* * * * *